United States Patent [19]

Lundgren

[11] 4,242,576

[45] Dec. 30, 1980

[54] ELECTRONIC IDENTIFICATION DEVICE

[75] Inventor: Sten T. Lundgren, Åkarp, Sweden

[73] Assignee: ID-Select Bo Thelin Och Co., Sweden

[21] Appl. No.: 857,428

[22] Filed: Dec. 5, 1977

[30] Foreign Application Priority Data

Dec. 14, 1976 [SE] Sweden ............ 7614043

[51] Int. Cl.[2] ............ G06K 7/00; H04Q 1/30; G06K 7/04

[52] U.S. Cl. ............ 235/435; 235/439; 340/149 A

[58] Field of Search ............ 235/435, 436, 439, 492, 235/491, 487, 488, 92 WT; 340/149 A, 146.3 K, 152 R, 167 R

[56] References Cited

U.S. PATENT DOCUMENTS

| | | | |
|---|---|---|---|
| 3,377,616 | 4/1968 | Aver | 340/146.3 K |
| 3,816,709 | 6/1974 | Walton | 235/439 |
| 3,849,633 | 11/1974 | Reitboeck | 235/439 |
| 3,859,634 | 1/1975 | Perron | 340/149 A |
| 3,906,460 | 9/1975 | Halpern | 235/439 |
| 3,929,277 | 12/1975 | Byrne | 235/92 WT |
| 3,934,122 | 1/1976 | Riccitelli | 340/149 A |
| 4,001,550 | 1/1977 | Schatz | 235/487 |
| 4,007,355 | 2/1977 | Moreno | 235/492 |

*Primary Examiner*—Robert M. Kilgore

*Attorney, Agent, or Firm*—Ostrolenk, Faber, Gerb & Soffen

[57] ABSTRACT

The disclosure relates to the computer art in general, and in particular to an identification device of the keyboard type which includes a rectifier for both supplying current to the device and for supplying a trigger signal to a pulse generator having several outputs. Upon receipt of the trigger signal, the pulse generator generates a predetermined sequence of pulses on its outputs which are connected to a combination circuit which has two outputs. The pulse generator is operative to generate a train of pulses, each pulse of the train being applied to a respective one of the outputs as a function of a code which identifies the device. The pulses appearing at these two outputs are inductively transferred to a detector which thus receives a pulse train containing a predetermined number of pulses, the polarity of each of the pulses being representative of a binary number constituting the identification code of the device.

9 Claims, 6 Drawing Figures

ELECTRONIC IDENTIFICATION DEVICE

BACKGROUND OF THE INVENTION

The present invention relates to an electronic identification device for emitting a pulse train which identifies the device.

For purposes of proving identity or the right to carry out a certain step, use is made, in many contexts, of coded proof, for example in the form of punched cards, magnetic cards and mechanical or electronic keys. Depending upon the contemplated field of use, each of these types of proof is possessed more or less of advantages and disadvantages of varying magnitude. Of particular interest is the electronic key or identification device in view of its capability to store a large amount of information.

Prior art electronic identification devices normally contain a memory which, requires a continuous current supply (e.g., a battery) to retain information. To retrieve the stored information, it has also been necessary to transfer a predetermined number of read or clock pulses, with the result that associated peripheral devices are relatively complicated and expensive.

The object of the present invention is to produce an electronic identification device of the type disclosed by way of introduction such that it is simple and inexpensive and which overcomes the disadvantages inherent in prior art devices.

BRIEF SUMMARY OF THE INVENTION

According to the invention, the identification device comprises a pulse generator with a trigger input and a plurality of outputs, the pulse generator being operative, on receipt of a signal on the trigger input, to sequentially generate a predetermined series of pulses on its outputs, a combinational circuit having a plurality of inputs, each connected to one of the outputs of the pulse generator, and two outputs, the circuit being operative to generate, for each pulse combination on the inputs, an output pulse on either of the two outputs, an inductively suppliable rectifier for current supply of the device and supplying a signal to the trigger input of the pulse generator, and an element coupled to the two outputs of the combinational circuit for inductive transfer of the output pulses to a detector.

BRIEF DESCRIPTION OF THE DRAWINGS

The nature of the present invention and its aspects will be more readily understood from the following brief description of the accompanying drawings, and discussion relating thereto.

In the accompanying drawings.

DETAILED DESCRIPTION OF THE INVENTION

Figure 1:
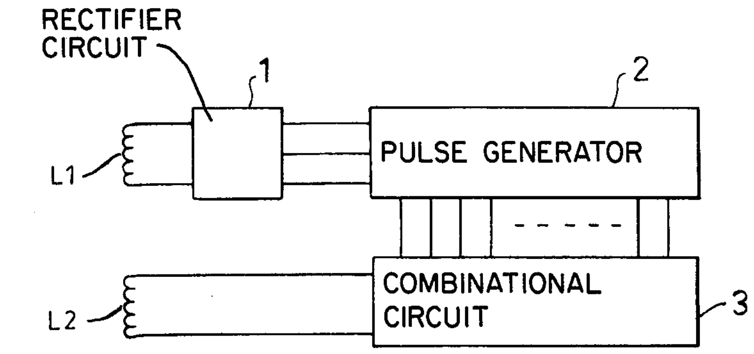
FIG. 1 is a block diagram of the identification device according to the present invention.

As is apparent from FIG. 1, the identification device according to the invention comprises a coil L1 which is connected to a rectifier 1 which supplies current to a pulse generator 2. Pulse generator 2 has a plurality of outputs which are coupled the inputs to a combinational circuit 3. Circuit 3 has two outputs which are connected to a coil L2. Rectifier 1 is also connected to a trigger input of the pulse generator 2, which is of such a nature that, on receipt of a signal on the trigger input, it sequentially generates a predetermined series of pulses on its outputs. The combinational circuit 3, whose output values at a certain point in time depend only upon its input values at this point in time, this generates, on either of its two outputs, an output pulse for each pulse combination on the inputs.

The pulse generator 2 may preferably be provided with a number of outputs corresponding to the number of pulses in the pulse train which is to be generated. Moreover, it may be operative, on triggering, to sequentially generate a pulse on each one of its outputs.

Figure 2:
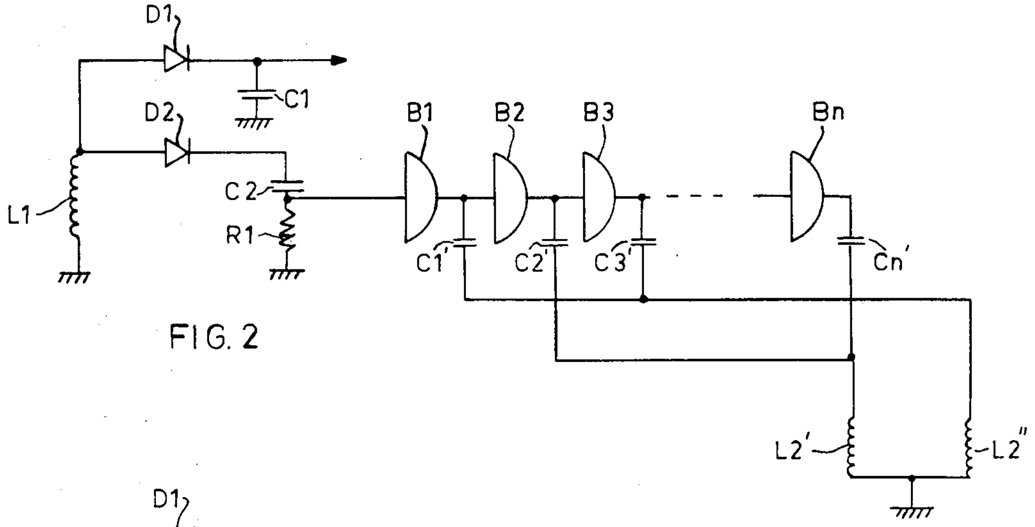
FIGS. 2 to 4 show, respectively, three embodiments of the device according to FIG. 1.

In the embodiment of the identification device shown in FIG. 2, the coil L1 is coupled in parallel to a diode D1 in series with a capacitor C1. A series-combination of one diode D2, one capacitor C2 and one resistor R1 is also coupled in parallel with the coil L1. The capacitor C1 is of considerably higher capacitance than the capacitor C2. A plurality of buffer circuits B1, B2, B3 . . . Bn with a predetermined signal transfer time delay, are cascaded together, the input of the first circuit B1 being coupled to the connection between the capacitor C2 and the resistor R1. The output of each of the buffer circuits B1–Bn is coupled, by means of a capacitor C1′-Cn′ either to one connection of a coil L2 or the other. The coil L2 has a grounded center tap and can therefore be considered as consisting of two windings L2′ and L2″.

The function of the embodiment of FIG. 2 is as follows. For sensing the binary identity code which is fixedly stored in the identification device by the alternative connection of the capacitors C1′-Cn′ to the coil windings L2′ and L2″, an AC voltage is induced for a predetermined period of time in the coil L1. This AC voltage is rectified by the diodes D1 and D2,and charges capacitors C1 and C2. Although not shown in FIG. 2, the voltage across the capacitor C1 is used as the supply voltage to the buffer circuits B1–Bn. The above-mentioned predetermined period of time is long enough to insure that the capacitor C1 is fully charged, and the raised potential at the node between the capacitor C2 and the resistor R1 has had time to be propagated to the output of the final buffer circuit Bn. When the induced AC voltage terminates at the end of the above-mentioned predetermined period of time, the potential at the input of the buffer circuit B1 will almost immediately fall to zero level, whereas the voltage across the capacitor C1 retains a strength sufficient for supplying the buffer circuits B1–Bn for a period which is at least as long as the sum total of the separate time-lag times of the buffer circuits B1–Bn. The lowered potential level on the input of the first buffer circuit B1 will thus be sequentially propagated to the outputs of all of the buffer circuits B1–Bn. Each time the potential at the output of one of the buffer circuits B1–Bn falls to zero, a current pulse is generated through either of the coil windings L2′ and L2″ as a result of the discharge of the capacitor C1′-Cn′ coupled between the output and either the coil winding L2′ or the coil winding L2″. By induction, the current pulses can be transferred through the coil windings L2′ and L2″ to a detector in such a manner that a current pulse in the coil winding L2′ gives rise to a voltage pulse of one polarity in the detector, whereas a current pulse in the coil winding L2″ gives rise to a voltage pulse of the opposite polarity in the detector. Thus, a train of pulses will be obtained in the detector, the polarity of the pulses being determined by which of the capacitors C1′ -Cn′ is coupled to the coil windings L2′, L2″, respectively. Naturally, the number of pulses in the pulse train is equal to the number of the capacitors C1′ -Cn′, i.e. n. The identification device can thereby generate one of $2^n$ different pulse trains.

Figure 3:
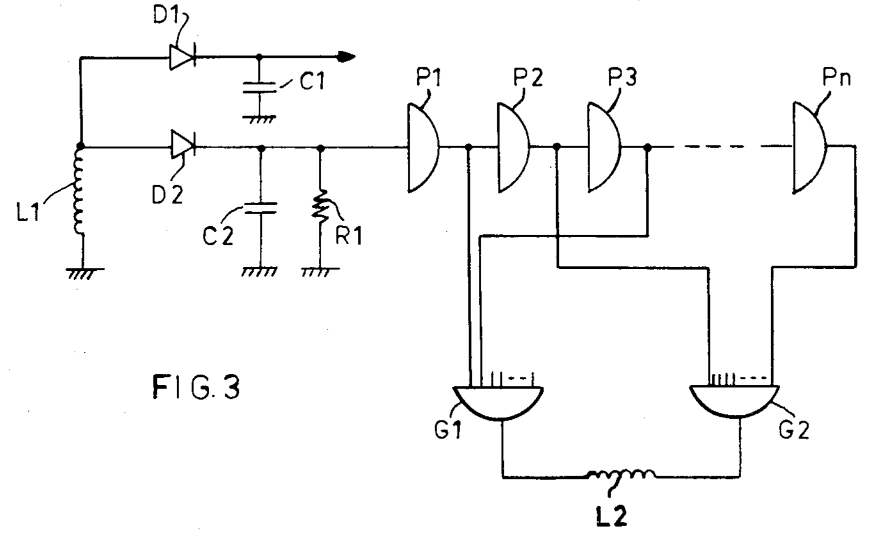

The embodiment of the identification device according to the present invention shown in FIG. 3 has an input section which is substantially identical to the input section according to FIG. 2 and comprises the coil L1, the diodes D1, D2, the capacitors C1, C2 and the resistor R1. A plurality of pulse circuits P1-Pn are cascaded, the input of the first pulse circuit P1 being coupled to the connection between the capacitor C2 and the resistor R1. The output of each pulse circuit P1-Pn is connected to an input of either AND-gate G1 or AND-gate G2. The coil L2 connects the outputs of the gates G1 and G2. Both the pulse circuits P1-Pn and the gates G1 and G2 are supplied with current from the capacitor C1.

Each one of the pulse circuits is operative, on triggering, to generate a single pulse of relatively short duration on its output. Furthermore, the nature of the pulse circuits is such that the circuits are triggered by means of a level conversion of the input signal, either in the positive or in the negative direction. Thus, they could consist of monostable multivibrators or one-shots.

The identification device shown in FIG. 3 operates as follows. As in the device of FIG. 2, an AC voltage is induced for a predetermined period of time in the coil L1. The thereby realized potential increase on the input of the pulse circuit P1 does not, however, trigger this pulse circuit. In this position, all of the pulse circuit outputs display a potential level corresponding to a logical "1". The outputs of the two AND-gates G1, G2 thereby display a level corresponding to logical "1", that is to say no current flows through the coil L2. At the end of the above-mentioned period of time, the potential on the input of the pulse circuit P1 falls, this potential change triggering the pulse circuit P1 which emits a pulse at a level corresponding to a logical "0". Thereby, the level on the output of the AND-gate G1 will fall to a level corresponding to logical "0", whereas the level on the output of the AND-gate G2 is not changed, that is to say a current pulse runs in one direction through the coil L2. Each pulse circuit following the pulse circuit P1, that is to say P2-Pn, is triggered by the trailing edge of the pulse generated by the preceding pulse circuit. Thus, the coil L2 will be sequentially traversed by as many current pulses as the number of pulse circuits P1–Pn, the direction of the current pulse through the coil L2 being dependent upon whether the output from the pulse circuit generating the pulse is connected to the gate G1 or the gate G2. It will be appreciated that the train of current pulses through the coil L2 may be detected in the same manner as the current pulse trains through the coil windings L2′ and L2″ in the embodiment according to FIG. 2.

Figure 4:
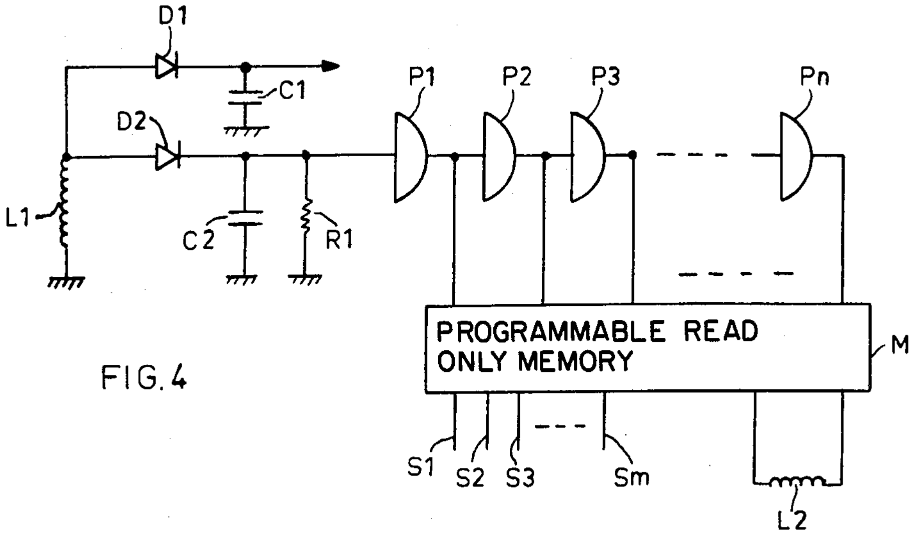

The embodiment of the identification device according to the present invention illustrated in FIG. 4 is identical to that of FIG. 3 with the exception that the gates G1 and G2 have been replaced by a programmable read-only-memory (PROM) M. The outputs of all of the pulse circuits P1–Pn, like the terminals of the coil L2 are connected to this read-only-memory. Moreover, the programmable read-only-memory M is provided with a number of program terminals or plugs S1–Sm, by the intermediary of which the read-only-memory can be programmed in such a manner that a pulse on any given output from the pulse circuits P1-Pn leads to a current pulse in one or the other direction through the coil L2.

Figure 5:
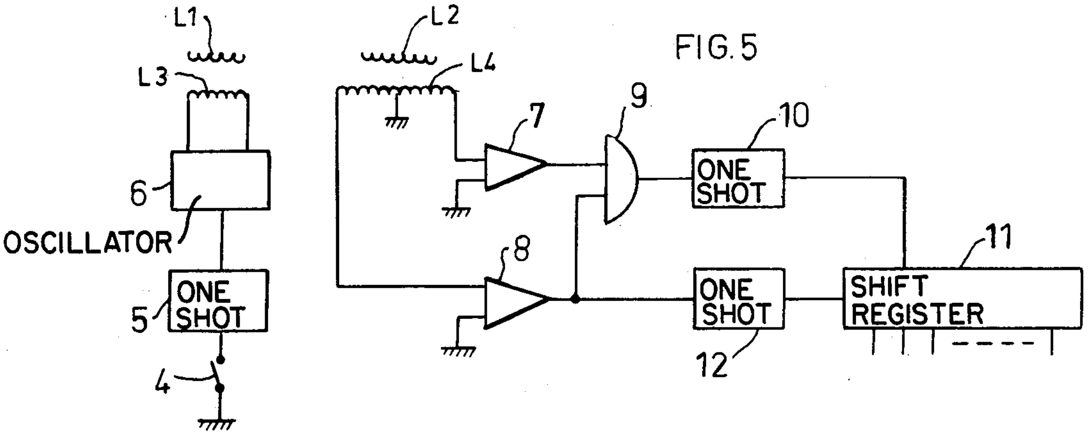
FIG. 5 shows a detector for sensing the information stored in the identification device.

The detector, shown in FIG. 5, for sensing the pulse train generated by the indentification device according to the invention is provided with a start switch 4 which is connected to the trigger input to a one-shot 5 whose output is connected to an energization input to an oscillator 6. A coil L3 is coupled to the outputs of the oscillator 6. A coil L4, which has a grounded center tap, is connected to the inputs of two amplifiers 7 and 8. The outputs of the amplifiers 7 and 8 are coupled to the inputs to an OR-gate 9, whose output is coupled via a one-shot 10 to the clock input of a shift register 11 which has as many steps as the number of output pulses in the pulse train from the identification device. The output of the amplifier 8 is, moreover, coupled via a further one-shot 12 to the supply input of the shift register 11. As is intimated in FIG. 5, the coils L3 and L4 are intended, on sensing of the identity code stored in the identification device according to the invention, to be inductively coupled to the coils L1 and L2, respectively.

The sensing operation proceeds as follows. When the start switch 4 is closed, the one-shot 5 generates a pulse of a predetermined length to the oscillator 6, which is thereby caused to feed, during this predetermined period in time, an AC voltage to the coil L3, this voltage being inductively transferred to the coil L1. As was earlier described, the output pulses from the identification device appear in the coil L2 after the end of the predetermined period of time, that is to say when the oscillator 6 no longer supplies the coil L3. Depending upon the direction in which the output pulses traverse the coil L2, the pulses are coupled inductively via the coil L4 for amplification either by the amplifier 7 or the amplifier 8. The amplified output pulses on the outputs of the amplifiers 7 and 8 compiled in the OR-gate 9 or triggering the one-shot 10 once for each output pulse. The amplified output pulses on the output of the amplifier 8 also trigger the one-shot 12. When all of the output pulses from the identification device have been fed through the coil L2, the shift register 11 will thus contain a binary number, in which a "0" corresponds to an output pulse amplified by the amplifier 7 and a "1" corresponds to an output pulse amplified by the amplifier 8.

Figure 6:
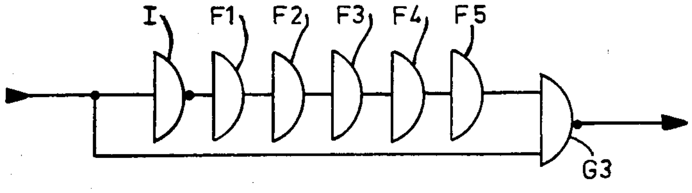
FIG. 6 illustrates a modification.

For purposes of exemplification, it might be mentioned that the buffer circuits B1–Bn may be of the type RCA 4050 and that the pulse circuits P1–Pn may be of the type RCA 4047. These latter circuits may also be of the type illustrated in FIG. 6 and may, thus, each consist of a NOR-gate G3, whose output constitutes the output of the pulse circuit and whose one input is directly coupled to the input of the pulse circuit, whereas its other input is coupled to the input of the pulse circuit by the intermediary of a number of time-lag circuits F1–F5 which may be of the same type as the buffer circuits B1–Bn, and an inverter I.

Furthermore, it might be mentioned that the identification device according to the invention may, in its practical realization, be in the form of a rod, which accommodates, on a circuit card, the rectifier 1, pulse generator 2 and the combinational circuit 3, whereas the coils L1 and L2 are wound on a common base which is disposed in a box-like ferrite core at one end of the rod. In the corresponding manner, the coils L3 and L4 in the detector, may be wound on a common base which is disposed in a ferrite core corresponding to that of the identification device.

It should be emphasized that the above-described embodiments are not restrictive, a multiplicity of modifications being possible within the spirit and scope of the present invention as disclosed in the following claims.

I claim:

1. An identification device for generating a train of pulses, each of said pulses having a respective first or second polarity according to a code identifying said device, responsive to a single input signal applied thereto, said input signal having a predetermined duration, said device comprising:

(A) a pulse generating circuit having a trigger input and two outputs and being capable of generating a train of pulses responsive to a single trigger signal applied to said trigger input, each of the pulses in said train of pulses being applied to one of said outputs, the particular one of said outputs to which each respective one of said pulses is applied being determined by said code;

(B) a rectifier circuit for both supplying power to said device and for applying said trigger signal to said trigger input responsive to said single input signal, said rectifier circuit comprising (1) a first diode coupled in series with a first capacitor, said first capacitor being coupled to said trigger input;

(2) a second diode coupled in series with a second capacitor, said second capacitor having a considerably greater capacitance than said first capacitor and being coupled to a power supply input of said pulse generator circuit; and (3) a first inductive means inductively receiving said input signal and applying said input signal to said first and second capacitors whereby said first capacitor serves as a trigger signal source and said second capacitor serves as a power source; and (C) inductive means coupled to said two outputs of said pulse generator circuit for inductively transferring said pulses to a detector circuit.

2. The device as recited in claim 1, wherein said pulse generating circuit includes a pulse generator and a combinational circuit, said pulse generator including a number of outputs corresponding to the number of pulses in the pulse train, and being operative, on triggering, to sequentially generate a pulse on each one of the outputs.

3. The device as recited in claim 2, wherein said pulse generator includes a plurality of cascade-connected pulse generating steps, whose outputs constitute the outputs of said pulse generator.

4. The device as recited in claim 3, wherein each said pulse generation step comprises a buffer circuit (B1-Bn) and a capacitor (C1′ –Cn′).

5. The device as recited in claim 3, wherein each pulse generation step includes a one-shot (P1-Pn).

6. The device as recited in claim 3, wherein each pulse generation step comprises a NOR-gate (G3) having first and second inputs and an output, said output constituting the output of the pulse generation step, said first input being connected to the input of the pulse generation step, said second input being coupled to the input of the pulse generation step via a number of time-lag circuits (F1-F5) and an inverter (I).

7. The device as recited in claim 4, wherein the combinational circuit (3) comprises a conductor which directly connects the pulse generation steps with one or the other terminal of a coil (L2) which is provided with an grounded center tap.

8. The device as recited in claim 3, wherein said combinational circuit (3) comprises a gate circuit with two AND-gate (G1, G2).

9. The device as recited in claim 3, wherein said combinational circuit (3) comprises a programmable read-only-memory (M).

* * * * *